(12) United States Patent
Gerhards et al.

(10) Patent No.: US 10,894,455 B2
(45) Date of Patent: Jan. 19, 2021

(54) TRAILING-ARM SUSPENSION WITH LEAF SPRINGS

(71) Applicant: FORD GLOBAL TECHNOLOGIES, LLC, Dearborn, MI (US)

(72) Inventors: Thomas Gerhards, Niederzier (DE); Ralf Hintzen, Aachen (DE); Daniel Mainz, Herzogenrath (DE); Rainer Souschek, Aachen (DE); Friedrich Peter Wolf-Monheim, Aachen (DE); Paul Zandbergen, Wuerselen (DE)

(73) Assignee: Ford Global Technologies, LLC, Dearborn, MI (US)

(*) Notice: Subject to any disclaimer, the term of this patent is extended or adjusted under 35 U.S.C. 154(b) by 62 days.

(21) Appl. No.: 16/190,714

(22) Filed: Nov. 14, 2018

(65) Prior Publication Data

US 2019/0143774 A1    May 16, 2019

(30) Foreign Application Priority Data

Nov. 14, 2017   (DE) .......................... 10 2017 220 238

(51) Int. Cl.
*B60G 3/14* (2006.01)
*B60G 21/055* (2006.01)
(Continued)

(52) U.S. Cl.
CPC .............. *B60G 3/14* (2013.01); *B60G 7/001* (2013.01); *B60G 11/04* (2013.01); *B60G 21/055* (2013.01);
(Continued)

(58) Field of Classification Search
CPC ........ B60G 21/055; B60G 3/14; B60G 7/001; B60G 11/04; B60G 2206/20;
(Continued)

(56) References Cited

U.S. PATENT DOCUMENTS 1,971,960 A  *  8/1934  Huntman ............... B60G 11/44
                                                        267/187
2,472,291 A     6/1949  Ford et al.
(Continued)

FOREIGN PATENT DOCUMENTS

DE          736950 C   *  7/1943    ............ B60G 11/04
DE         1024814 B   *  2/1958    ........... B60G 11/182
(Continued)

OTHER PUBLICATIONS

Machine Translation of DE-10258021 (Year: 2004).*
(Continued)

*Primary Examiner* — James A English
*Assistant Examiner* — Kurtis Nielson
(74) *Attorney, Agent, or Firm* — Raymond L. Coppiellie; Brooks Kushman P.C.

(57) ABSTRACT

A motor vehicle rear suspension includes left and right trailing links mounted, at respective forward ends thereof, to a vehicle body for pivoting movement about a transversely-extending axis. The trailing links extend rearward from the axis, and each has a wheel carrier attached thereto adjacent a rear end thereof. Left and right leaf springs are fixed, at respective forward ends thereof, to the vehicle body and extend rearward therefrom alongside and generally parallel with their respective trailing links. Rear ends of the leaf springs contact their respective trailing links and applying spring-force thereto.

12 Claims, 4 Drawing Sheets

(51) Int. Cl.
*B60G 7/00* (2006.01)
*B60G 11/04* (2006.01)

(52) U.S. Cl.
CPC .. *B60G 2202/112* (2013.01); *B60G 2204/121* (2013.01); *B60G 2206/20* (2013.01)

(58) Field of Classification Search
CPC ........ B60G 2204/121; B60G 2202/112; B60G 3/185; B60G 3/12; B60G 3/145; B60G 21/05
USPC ..... 280/124.106, 124.166, 124.175, 124.131
See application file for complete search history.

(56) References Cited

U.S. PATENT DOCUMENTS

| | | | | |
|---|---|---|---|---|
| 3,373,834 A | * | 3/1968 | Rosenkrands | B60G 21/051 180/353 |
| 3,781,032 A | * | 12/1973 | Jones | B60G 3/14 280/124.133 |
| 4,089,544 A | * | 5/1978 | Raidel | B60G 11/46 267/31 |
| 4,580,798 A | * | 4/1986 | Roelofs | B60G 9/003 280/124.163 |
| 4,681,343 A | * | 7/1987 | Gallet | B60G 11/04 280/124.128 |
| 4,758,019 A | * | 7/1988 | Tucker-Peake | B60G 11/04 280/124.109 |
| 4,832,364 A | * | 5/1989 | Kikuchi | B60G 3/16 280/124.128 |
| 6,086,162 A | * | 7/2000 | Pinch | B60G 3/145 228/185 |
| 6,672,605 B2 | | 1/2004 | Basnett | |
| 8,777,247 B2 | | 7/2014 | Ehrlich et al. | |
| 2002/0079666 A1 | | 6/2002 | Basnett | |
| 2003/0111814 A1 | * | 6/2003 | Sutton | B60G 11/08 280/124.131 |
| 2007/0052194 A1 | * | 3/2007 | Marchel | B60G 21/051 280/124.166 |
| 2007/0267790 A1 | * | 11/2007 | Furman | B60G 11/107 267/36.1 |
| 2013/0099462 A1 | | 4/2013 | Ehrlich et al. | |

FOREIGN PATENT DOCUMENTS

| | | | | |
|---|---|---|---|---|
| DE | 3122417 A1 | * | 12/1982 | B60G 11/04 |
| DE | 3149309 A1 | * | 6/1983 | B60G 11/04 |
| DE | 3338467 A1 | * | 5/1985 | B60G 11/44 |
| DE | 10258021 A1 | * | 7/2004 | B60G 3/14 |
| DE | 102005043628 A1 | * | 5/2006 | B60G 7/02 |
| DE | 102009028540 A1 | | 2/2011 | |
| DE | 2014003592 A1 | | 1/2014 | |
| DE | 102014223632 A1 | * | 5/2016 | B60G 9/003 |
| FR | 556694 A | * | 7/1923 | B60G 11/04 |
| FR | 694029 A | * | 11/1930 | B60G 11/04 |
| FR | 2662643 A1 | * | 12/1991 | B60G 3/14 |
| FR | 2666279 A1 | * | 3/1992 | F16F 1/3686 |
| GB | 142171 A | * | 4/1920 | B60G 11/04 |
| JP | 01266009 A | * | 10/1989 | B60G 11/44 |
| WO | WO-2018211302 A1 | * | 11/2018 | F16F 1/26 |

OTHER PUBLICATIONS

Machine Translation of WO-2018211302 (Year: 2018).*
Machine Translation of FR-2662643-A1 (Year: 1991).*
Machine Translation of DE-3338467-A1 (Year: 1985).*

* cited by examiner

TRAILING-ARM SUSPENSION WITH LEAF SPRINGS

CROSS-REFERENCE TO RELATED APPLICATIONS

This application claims foreign priority benefits under 35 U.S.C. § 119(a)-(d) to DE Application 10 2017 220 238.6 filed Nov. 14, 2017, which is hereby incorporated by reference in its entirety.

TECHNICAL FIELD

The invention relates to a torsion beam axle for pivoting mounting on a vehicle body, with a torsion section extending along the Y-axis and with two trailing links joined by the torsion section and extending backward along the X-axis, each of them having a wheel carrier attachment region.

BACKGROUND

In motor vehicles, a great variety of suspensions are known for the wheels of the vehicle. In particular, one may distinguish between the single wheel suspension primarily used today for passenger cars and the rigid axle suspension used primarily for rear axles of utility vehicles. But alongside these, there also exist so-called semirigid axles, in which the wheels of an axle, provided on both sides, or their wheel carriers are attached to two trailing links, which are connected in pivoting manner at a body-side end to the vehicle sprung structure, usually to the chassis. Typically, a tubular bushing socket is formed at the body side for a bearing bush. The two trailing links are joined together by an axle bridge extending in the transverse direction (sometimes also called the transverse beam or torsion profile). The latter is designed to be bending-stiff, but torsion-yielding, so that it transmits a torque between the trailing links in the manner of a stabilizer when their deflection is uneven. Depending on the position of the axle bridge along the trailing link, one distinguishes between a torsion beam axle (axle bridge closer to the body end), a coupling beam axle (axle bridge roughly in the middle of the trailing links) and a torsion crank axle (axle bridge at the end away from the body). Besides these semirigid axles, in which the trailing links are joined by an axle bridge as described, so-called trailing link axles are also known, in which the trailing links have no transverse connection and can move independently of each other.

Apart from accommodating the wheel carriers, the trailing links also often serve for the bracing of springs and/or spring dampers. According to one widespread design, a spring seat is arranged on the respective trailing link, which spring seat may be welded on for example as a spring plate. A corresponding spring plate is arranged on the vehicle body above the trailing link and a helical spring is held with form fit between the two spring plates. Normally, the upper spring plate is fastened to a longitudinal beam of the vehicle frame. Only a slight constructive tolerance exists for the respective arrangement of the spring plates, especially since the upper spring plate needs to be arranged at least roughly vertically above the lower spring plate. The maximum available design space for the helical spring is restricted by the vertical spacing between the trailing link and the part of the vehicle body on which the upper spring plate is arranged. In turn, this produces either a limiting of the maximum spring travel or the length of the spring, or the number of its winding turns. These limitations often result in unsatisfactory compromises.

From U.S. Pat. No. 8,777,247 B2 there is known a wheel suspension device for a motor vehicle, with a torsion beam axle, which is joined by pivot bearings to a vehicle body. Rod-like coupling devices are arranged on either side roughly in the area of wheel bearings formed on the torsion beam axle, by which coupling devices the torsion beam axle is hinged to a transverse leaf spring. The transverse leaf spring is connected at two spaced-apart points to the vehicle body.

U.S. Pat. No. 6,672,605 B2 shows a wheel suspension with a semirigid axle, in which two trailing links pivot-mounted on the vehicle body are joined by an axle bridge. Beneath each trailing link there is arranged a leaf spring, which is connected at the end in pivoting manner to the vehicle body on both sides and secured in a middle region by clamps to the trailing link situated above it.

WO 2014/003592 A1 discloses a wheel suspension with a torsion beam axle, in which the trailing links can be designed as a single piece with the axle bridge. The attachment of the torsion beam axle relative to the vehicle body is done by two leaf springs, which extend to the front from the trailing links or from the axle bridge and are clamped at a front end to the vehicle body.

From U.S. Pat. No. 2,472,291 A there is known a device for cushioning a vehicle body against rolling movements. A vehicle axle is connected by lever arms extending diagonally to the rear to a torsion spring extending in the transverse direction. The vehicle axle is furthermore connected by the lever arms to a leaf spring stack extending in the transverse direction, which leaf spring stack, for its part, is connected to the vehicle body. In the event of a rolling movement of the vehicle body, the movement is limited on the one hand by a torsion of the vehicle axle and on the other hand by a torsion of the torsion spring.

U.S. Pat. No. 1,971,960 A discloses a rear axle suspension in which a rear axle is braced on both sides by spring clamps with leaf spring stacks. The leaf spring stacks are connected in the manner of a Hotchkiss suspension to longitudinal beams of a vehicle frame. Adjacent to the vehicle axle, ascending connection arms are hinged to the respective leaf spring stacks, which in turn are hinged to levers extending in the longitudinal direction. The two levers are joined together by a torsion spring extending in the transverse direction.

DE 10 2009 028 540 A1 shows a torsion beam axle of a rear wheel suspension in a vehicle, having a leaf spring and a trailing link on each side of the vehicle, as viewed in the travel direction, as well as a transverse beam joining together the trailing links. The leaf spring is joined at the end in each case to the vehicle body in pivoting manner. The transverse beam, which is U-shaped overall, has one beam arm pointing in the travel direction on each side of the vehicle, so that the beam arms together with the leaf springs secured to them by non-positive locking form the trailing links.

In view of the indicated prior art, the suspension of an axle in which the wheels are connected by trailing links to the vehicle body still leaves much room for improvements.

SUMMARY

The problem which the invention addresses is to provide a trailing link axle or a semirigid axle with optimized suspension.

According to the invention, the problem is solved by a wheel suspension with the features of claim 1, while the dependent claims relate to advantageous embodiments of the invention.

It should be pointed out that the features and measures mentioned individually in the following description may be combined with each other in any technically meaningful way and designate further embodiments of the invention. The description characterizes and specifies the invention additionally in particular in connection with the figures.

The invention provides a wheel suspension with two trailing links extending backward along the X-axis, each of which is mounted at least indirectly on a vehicle body with the ability to pivot about a pivot axis. In particular, this may be a wheel suspension for a motor vehicle such as a truck, a transporter or a passenger car. However, an application for trailers is also possible, for example. All references to the X-axis, Y-axis and Z-axis of the vehicle pertain here and in the following to the correctly installed state. The trailing links extend along the X-axis to the rear (i.e., counter to the travel direction). They do not necessarily run parallel to the X-axis, but instead may be inclined relative to it at least in part. In particular, they may be curved and/or angled entirely or for a section. For example, they may be formed as shaped sheet metal parts or cast metal parts, but a formation from fiber composite is also possible. Each trailing link may be fabricated as a single piece or consist of a multitude of pieces joined together. As shall be explained further below, the trailing links may also be joined together. Each of the trailing links is pivot-mounted on the vehicle body either directly or indirectly, i.e., via an interpositioned element. In this way, a pivot axis is produced, which normally extends parallel to the Y-axis (transverse axis) and is identical for both trailing links. Yet configurations are also possible in which the trailing links can pivot about different pivot axes not running parallel to the Y-axis. The term "vehicle body" serves in this context as a collective term for the bodywork, the chassis, and, if applicable, an auxiliary frame or subframe. Usually the trailing links are mounted on a chassis of the vehicle. The mounting may occur by way of elastic bearings, such as rubber-metal bearings, as is well known in the suspension arts.

The trailing links each have a wheel carrier attachment region which serves for attaching a wheel carrier thereto, which in turn serves for holding a wheel of the vehicle. The respective trailing link is designed for pivoting guidance of the wheel carrier with respect to the vehicle body. Usually the wheel carrier attachment region is situated in a rear portion of the trailing link, such as in its rear third. In the wheel carrier attachment region, a separately fabricated fixture for the wheel carrier can be connected to the trailing link. Normally, the wheel carrier is connected rigidly to the trailing link, but in the context of the invention an articulated connection, for example, is also conceivable. It is also conceivable, however, for a wheel carrier to be designed as a single piece with the trailing link, so that the wheel carrier attachment region is a region in which the trailing link passes into the wheel carrier.

The trailing links may have fixtures for attaching shock absorbers, which fixtures can, for example, be welded to the trailing links at the side or can be formed as a single piece with them when manufactured from a fiber composite.

Furthermore, the wheel suspension comprises two leaf springs for suspending the trailing links relative to the vehicle body. One may associate the trailing links, as well as the wheel carriers and the wheels arranged on them, with the unsprung mass of the vehicle, while the vehicle body to which the trailing links are attached is associated with the sprung mass. The leaf springs serve to apply spring-force which thereby generates a restoring force (or a restoring torque) in the event of a pivoting movement of the trailing links upward with respect to the vehicle body, based on elastic deformation (or, more precisely, a bending or flexion) of the respective leaf spring. Each leaf spring may be associated with one of the trailing links (and vice versa), i.e., normally one leaf spring is arranged to apply spring-force to one trailing link. The respective leaf spring may be straight or alternatively bay be bent at least for a portion in the relaxed state. Although the use of a single leaf spring is preferred, it is conceivable in the context of the invention for the respective leaf spring to be part of a leaf spring stack.

According to the invention, each leaf spring is fastened at its forward end to the vehicle body at a fastening region thereof, so that it is unable to pivot about the vehicle transverse (Y) axis (or is able to pivot only to a very small degree) relative to the vehicle body. That is, the respective leaf spring is fastened at the forward end, and not both ends, with respect to the vehicle body. The corresponding fastening region may correspond in particular to a first end region of the leaf spring. The fastening is normally based at least in part on a positive locking, although there may also be at least in addition a non-positive locking and/or an integral bonding connection. The fastening is such that the leaf spring can deflect or rotate (about a vehicle transverse axis) at most to a limited degree with respect to the vehicle body in the fastening region or the ability of the leaf spring to rotate with respect to the vehicle body is at least limited. A certain ability to rotate may be present, for example due to a fastening by an elastic bearing, yet this is restricted, for example to an angle range of less than 30° or less than 20° overall. In this case, one may also speak of a rotationally elastic fastening. In particular, the limited ability to rotate means that a restoring torque can act on the leaf spring in the fastening region due to the vehicle body, preventing any rotation of the latter.

The leaf spring engages the trailing link in force-transmitting manner at a coupling region at a distance rearward from the fastening region. The coupling serves for a force transmission and need not take the form of a fastening; for example, it may also be a bearing of the leaf spring against the trailing link on one side. Of course, the coupling may also be produced indirectly by way of an intervening element, which is fastened e.g. to the leaf spring or to the trailing link. Naturally, the coupling is designed here so that a bending moment is exerted on the leaf spring upon a pivoting movement of the trailing link. This, in turn, results from the limited ability of the leaf spring to rotate in the fastening region with respect to the vehicle body. That is, in the fastening region the leaf spring cannot follow the movement of the trailing link, whereas in the coupling region, where it is coupled to the trailing link, it follows its movement. The coupling region normally corresponds to a second or rearward (relative to the vehicle longitudinal or X-axis) end region of the leaf spring, opposite the aforementioned first end region. Between the fastening region and the coupling region the leaf spring is generally guided in a self-supporting manner, i.e., it has no contact with other components there.

The suspending of the trailing links with respect to the vehicle body is preferably provided solely by the leaf springs, so that further spring elements, such as helical springs, are dispensed with. In addition, further spring elements could be used in the context of the invention, although these could be relatively small and/or lightweight, since they would merely supplement the action of the leaf spring.

The suspending of the respective trailing link by a leaf spring allows the design space to be greatly reduced as compared to the use of helical springs. This applies in particular to the vertical design space. In contrast to designs in the prior art where helical springs are used, no compromises need therefore be made in terms of the spring travel or the length of the spring. As regards the positioning of the leaf spring, there is more latitude than in the case of a helical spring, which must normally be arranged beneath a longitudinal beam and oriented at least approximately vertically. In some cases, the manufacturing costs of a leaf spring may also be less than those of a helical spring of comparable performance. The fastening of the leaf spring to the vehicle body at only one side is also an advantage, this fastening allowing the leaf spring to be shorter in design than in the case of a two-sided fastening for example, which would have a coupling to the trailing link in a middle region. Furthermore, the mechanical layout and the assembly of the wheel suspension is simplified by the one-sided fastening. The position of the leaf spring may be chosen more freely, since it does not need to be positioned such that its rear end can be attached to a sufficiently stable region of the vehicle body, as in the case of two-sided fastening. It is also easier to realize a larger freedom of movement in the coupling region than in the case of a two-sided fastening, so that a larger spring path is possible. Moreover, there is more vertical design space underneath the wheel carrier and thus a greater ground clearance.

Preferably, the trailing links are joined together as parts of a semirigid axle by an axle bridge extending along the Y-axis. That is, the wheel suspension has a semirigid axle, which in turn comprises the trailing links and the axle bridge. As is usual with semirigid axles, the axle bridge is preferably bending-stiff, but at least partly torsion-yielding, while the trailing links are preferably stiff to bending and torsion. In any case, the axle bridge serves for generating a restoring force or a restoring torque in the event of uneven deflection due to torsion, by which restoring force or restoring torque the uneven deflection and thus a possible rolling movement of the vehicle body are limited. The axle bridge extends along the Y-axis (transverse axis) of the vehicle. It may run at least for a portion in parallel with the Y-axis, but it may also stand at an angle to the Y-axis at least partly, i.e., it may be straight, like the trailing links, but also be curved and/or angled for at least a portion. The axle bridge can be made of metal (such as steel) as a shaped sheet metal part or tubular profile, but a fabrication from fiber composite or the like is also conceivable. In particular, the axle bridge may be fabricated at least partly as a single piece with the trailing links, for example by primary forming or reshaping.

In general, the semirigid axle may be designed as a torsion crank axle, a coupling beam axle, or a torsion beam axle. In the case of the torsion crank axle, the axle bridge is connected to the trailing links near a rear end (roughly at the level of the wheel carrier attachment regions). In the case of a coupling beam axle, the axle bridge is connected to the trailing links in a middle region, while for a torsion beam axle it is connected to the trailing links near a front end (roughly at the level of the pivot axis). The axle bridge need not be connected to the front end of the respective trailing link, but instead the respective trailing link may extend further to the front beyond the axle bridge. One or more bearings for the pivoting attachment of the trailing links to the vehicle body may be arranged on the trailing links themselves or else on the axle bridge. Alternatively, the semirigid axle could be mounted by way of separately fabricated attachment arms on the vehicle body, which arms are connected for example either to the axle bridge or to the trailing links and which extend to the front along the X-axis.

Preferably, at least one leaf spring is fastened to the vehicle body in the region of the pivot axis. That is, the fastening region is arranged in the area of the pivot axis or vice versa. The fastening region may be arranged e.g. (in the Y-direction) to the side of a pivot bearing, by means of which the respective trailing link is connected to the vehicle body. It is also possible to modify an inner sleeve of a rubber-metal bushing, serving for the pivot-mounting of the trailing link, so that it serves for the fastening of the leaf spring. Insofar as reference is made here and in the following to "at least one leaf spring" or "at least one trailing link", this refers preferably to both leaf springs or both trailing links, since the wheel suspension is preferably symmetrical in design.

As already explained above, the ability of the leaf spring to rotate with respect to the vehicle body may be restricted, for example in the case of a rotationally elastic connection. According to another preferred embodiment, at least one leaf spring is fastened rotationally fixedly to the vehicle body in the fastening region. Normally, this means that the leaf spring is fastened rigidly to the vehicle body. For example, one end of the leaf spring might be clamped on the vehicle body for this purpose. Additionally, one or more connection bolts could also pass through the leaf spring. In general, the rigid connection may be realized by positive locking, non-positive locking, and/or integral bonding.

According to one embodiment, at least one leaf spring extends along the X-axis. In this case, it may also be called a longitudinal leaf spring. This includes the possibility of it running entirely or partly at an angle to the X-axis, i.e., being inclined as a whole with respect to it, for example, or having a curved or angled shape. But it may also run in particular at least predominantly in parallel with the X-axis. In any case, an extension along the X-axis is advantageous, since as a result only slight design space is needed in the vertical direction (along the Z-axis) even for a relatively long leaf spring. In particular, the leaf spring may extend along the trailing link in the described embodiment.

The position of the coupling region may be chosen different. Here, the effective length of the respective leaf spring (i.e., the portion primarily involved in the elastic deformation) is determined by the spacing between the fastening region and the coupling region. Normally, the coupling region is arranged in a rear half or in a rear third of the trailing link. In particular, it is preferable that at least one leaf spring is coupled to a trailing link in the region of the wheel carrier attachment region. In this way, the effective length of the leaf spring is maximized, especially when the fastening region is arranged close to the pivot axis. If the effective length of the leaf spring is smaller, only a lesser deformation of the leaf spring will occur for a given deflection of the respective trailing link, so that said leaf spring needs to be stiffer accordingly to generate a desired restoring force. Moreover, the forces occurring in the fastening region and in the coupling region are larger, which may in some cases lead to premature wearing, or to structural parts having to be more stable and thus heavier in design.

According to one preferred embodiment, at least one trailing link has a bearing element for the coupling of the leaf spring, on which bearing element the leaf spring is movably guided. The bearing element may be designed as a single piece with the trailing link or else be fabricated separately and connected to the trailing link. The leaf spring is guided displaceably on it, which normally means a displaceability in the longitudinal direction of the leaf spring. Thanks to the displaceability, a length compensation can occur, which is generally necessary due to the deformation of the leaf spring during the deflecting and rebounding of the trailing link. The bearing element may form a plain bearing for the leaf spring. Alternatively to a displaceable or sliding guidance of the leaf spring, the leaf spring may also be connected e.g. by an elastic element to the trailing link. The elastic element might consist of rubber, for example, and be integrally bonded to the leaf spring and the trailing link. In this case, the required length compensation would occur with deformation of the elastic element.

In particular, at least one leaf spring may bear against an upward-facing surface of the bearing element. In other words, the leaf spring is disposed above the bearing element and bears against it. Since static and dynamic forces on the part of the trailing link act predominantly in the direction of the Z-axis (i.e., vertically) and in this regard only upward, a bracing from above (possibly supplemented with a lateral guidance) is sufficient; the leaf spring may rest against the bearing element, being held in contact with the bearing element by the equilibrium of spring force and weight of the vehicle body (and of dynamic forces occurring during operation of the vehicle).

As already mentioned above, the vertical design space can be minimized by the use according to the invention of leaf springs. According to one especially preferred embodiment, at least one leaf spring is disposed at least predominantly along the Z-axis (i.e., in the vertical direction) at the level of the trailing link. That is, in this embodiment the leaf spring projects not at all or only little in relation to the trailing link in the vertical direction. Nevertheless, even in this extremely space-saving design the full spring effect can be achieved, in a similar manner to a helical spring of the prior art. The leaf spring is generally arranged next to the trailing link in the direction of the Y-axis, although it could also be arranged inside the trailing link, for example, if the trailing link is designed as a hollow profile.

All of the above-described benefits of the invention can be realized with a leaf spring made of spring steel. However, the wheel suspension can be further optimized in that at least one leaf spring is made of composite material. In particular, it may consist at least partly of fiber composite. Fiber composites here include all materials in which fibers such as glass fibers, carbon fibers, and/or aramide fibers are embedded for reinforcement in a polymer matrix (such as a plastic or synthetic resin matrix). Optionally, further particles, layers or components, which cannot be classified as a polymer or as fibers may be embedded or attached. Thanks to the fabrication from composite material, the respective leaf spring and thus the wheel suspension as a whole, can be more lightweight than in the case of manufacture from spring steel. Furthermore, almost any desired shapes can be realized with a single primary shaping step in the case of composite materials.

Further advantageous details and effects of the invention will be explained more closely in the following with the aid of a sample embodiment, represented in the figures, in which:

DETAILED DESCRIPTION

In the different figures, identical parts are always given the same reference numbers, so that they will generally only be described once.

Figure 1:
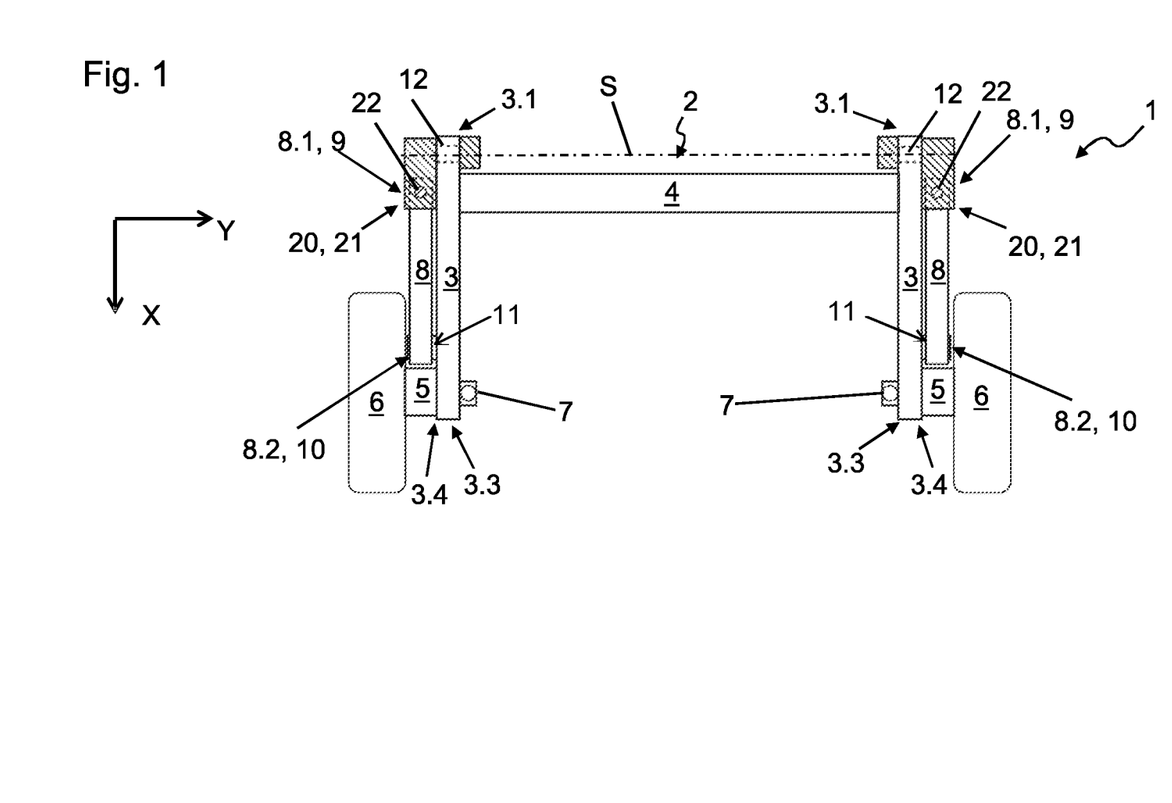
FIG. 1 shows a partial sectional representation of a top view of a wheel suspension according to a first embodiment.
Figure 2:
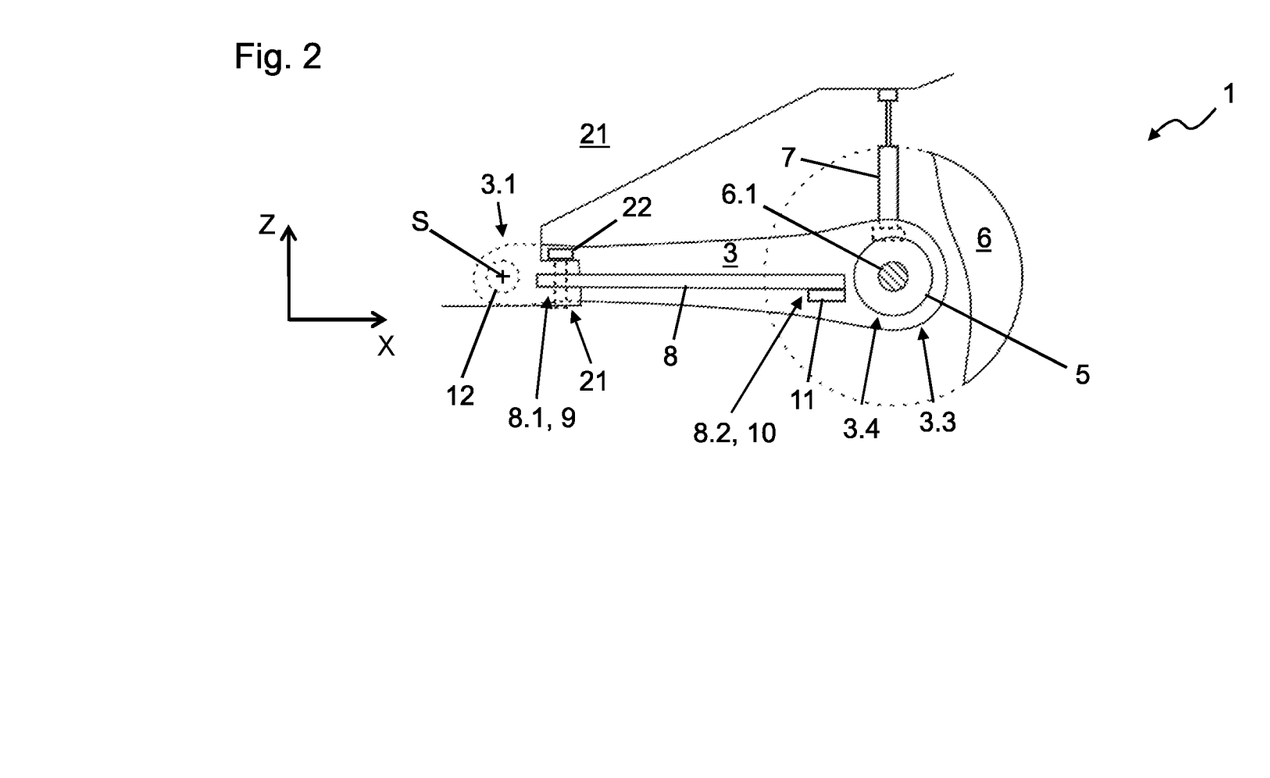
FIG. 2 shows a partial sectional representation of a side view of the wheel suspension of FIG. 1.

FIGS. 1 and 2 show different views of a first embodiment of a wheel suspension 1, which can be used e.g. for a passenger car, a transporter or a truck. The wheel suspension 1 serves for the attaching of wheels 6 of a vehicle rear axle to a vehicle body 20.

One can see a semirigid axle 2 with two trailing links 3 extending to the rear along the X-axis, which trailing links may be formed as stamped or otherwise shaped sheet metal parts, for example. At a front end 3.1, the trailing links 3 each have a bushing socket, in which rubber-metal bushings 12 are press-fitted, thereby creating a pivot-mounting on the vehicle body 20 about a pivot axis S. The two trailing links 3 may be joined together by an axle bridge 4, which extends generally parallel to the Y-axis and is arranged in the manner of a torsion beam axle closer to the front end 3.1 than to an opposite rear end 3.3 of the respective trailing link 3. However, this should be taken merely as an example and the axle bridge 4 might also be arranged, e.g., in the manner of a crank arm axle closer to the rear end 3.3. The axle bridge 4 may be formed, e.g., as a U-profile or V-profile and may be welded to the trailing links 3. Alternatively, however, the trailing links 3 could also be made as a single piece with the axle bridge 4 from fiber composite, for example.

In the region of the rear end 3.3, each trailing link 3 has a wheel carrier attachment section 3.4, on which is mounted a wheel carrier 5, shown here in a highly schematic manner, which can optionally also be formed at least partly as a single piece with the respective trailing link 3. Each wheel carrier 5 serves for the rotatable holding of a hub 6.1 of a wheel 6 in a conventionally known manner. The axle bridge 4 serves for generating a restoring force or torque in the event of uneven deflection of the wheels 6 relative to one another due to torsion, by which restoring force or torque the uneven deflection and thus a possible rolling movement of the vehicle body 20 are limited. In the region of the wheel carrier attachment section 3.4, a shock absorber 7 may be connected to each trailing link 3. An opposite/upper end of the shock absorber 7 is connected to the vehicle body 20.

Whereas the shock absorber 7 extends upward in conventional manner and serves for suppressing an unwanted vibration or oscillation behavior of the semirigid axle 2 with respect to the vehicle body 20, the suspension occurs by way of left and right leaf springs 8, which extend along the X-axis alongside of the trailing links 3 (with respect to the Y-axis). Each leaf spring 8 is fastened at a first or forward end 8.1 to the vehicle body 20 in a fastening region 9 thereof. The leaf spring 8 is firmly retained, for example by fitting into a recess of a fixture 21 on the vehicle body 20 and may additionally be secured by a bolt 22, which passes through it. Thus, the forward end 8.1 of the leaf spring 8 is fixed against rotation (about an axis generally parallel with the vehicle Y-axis and/or the pivot axis S) relative to the vehicle body 20 in the fastening region 9. In the embodiment shown, the fastening is performed in the region of the pivot axis S, more precisely set back slightly to the rear thereof. But a fastening is also possible in other positions, both in the region of the pivot axis S and outside this region. The above-described configuration causes leaf springs 8 to be mounted to the vehicle in the manner of a rearwardly-extending cantilever beam, and the springs 8 may thus alternatively be referred to as cantilever springs.

At a rear end 8.2, the leaf spring 8 is coupled in a coupling region 10 in force-transmitting manner to the trailing link 3. The coupling region 10 is preferably disposed closely adjacent to the wheel carrier attachment region 3.4. The trailing link 3 comprises a bearing element 11 (which may be formed as a separate component that is attached to the trailing link, or alternatively may be formed integrally with the trailing link) which provides a surface or abutment against for the rear end 8.2 of the leaf spring 8 bears. The leaf spring 8 thus contacts from above an upwardly-oriented surface of the bearing element 11, but is free to slide displaceably on the bearing element 11 in its longitudinal direction. The bearing element 11 here forms a flat bearing surface for the leaf spring 8 making possible a length compensation between the fastening region 9 and the coupling region 10. When the respective trailing link 3 is deflected due to upward movement of the wheel carrier 5 relative to the vehicle body, the fixation of the front end 8.1 on the vehicle body 20 and the coupling of the rear end 8.2 to the trailing link 3 cause a bending moment to be exerted on the leaf spring 8. This bending moment results in the elastic bending of the leaf spring 8, which in turn results in a spring-force by which a restoring force or torque is applied to the trailing link 3 by the leaf spring.

The leaf spring 8 can be made of spring steel, but preferably it consists of fiber composite, as a result of which its weight can be minimized. As best seen in FIG. 2, the leaf spring 8 is disposed alongside the trailing link 3 and at approximately an equal height or level relative to the vehicle Z-axis. By contrast with the helical springs used in prior art trailing link suspensions, the leaf spring 8 therefore does not project in relation to the trailing link 3 in the vertical direction. Therefore, no compromise is necessary in regard to the dimensioning of the spring and the spring travel. Since there is only a one-sided fastening on the vehicle body 20, the leaf spring 8 may also be designed to be relatively short in the longitudinal direction (in the direction of the X-axis).

Figure 3:
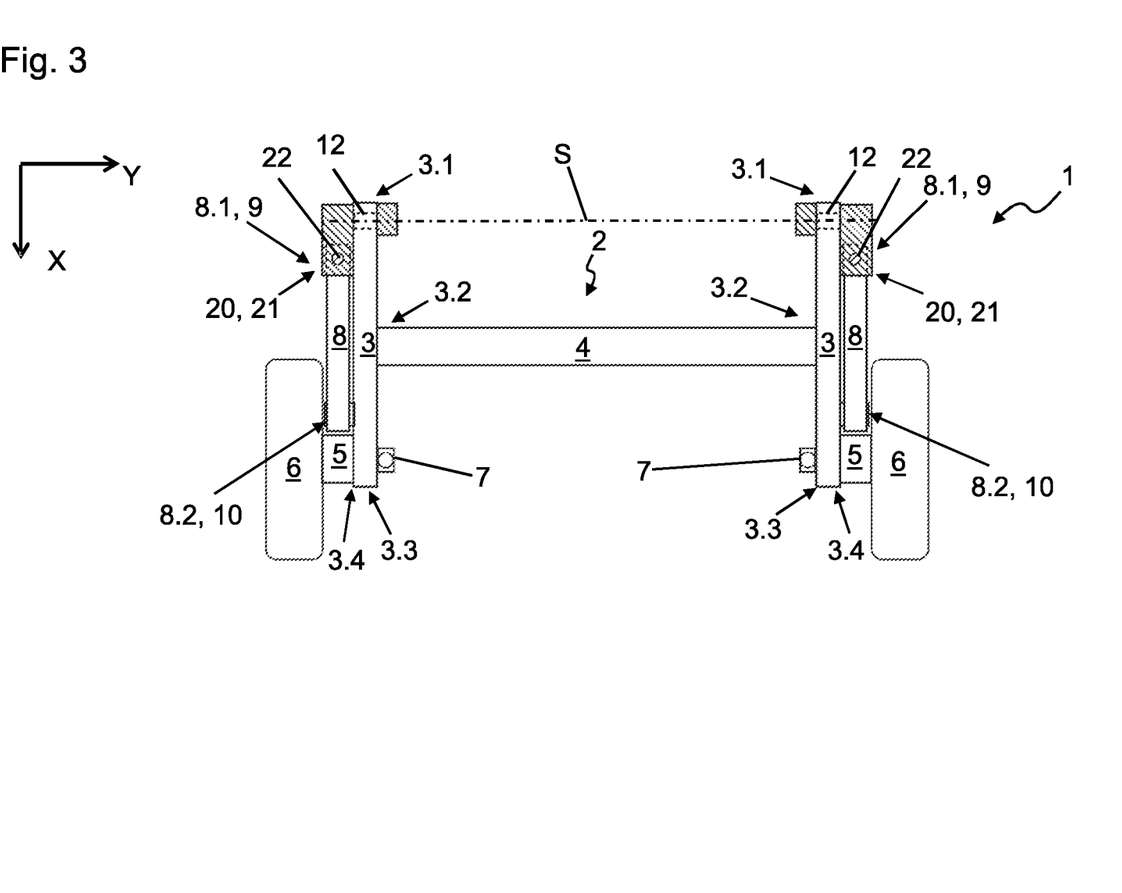
FIG. 3 shows a top view of a wheel suspension according to a second embodiment.

FIG. 3 shows a plan view representation of a second embodiment of a wheel suspension 1 which corresponds largely to the first embodiment, common features of which accordingly will not be described again. However, the semirigid axle 2 here is formed as a coupling beam axle, i.e., the axle bridge 4 is arranged in a middle region 3.2 of the trailing links 3.

Figure 4:
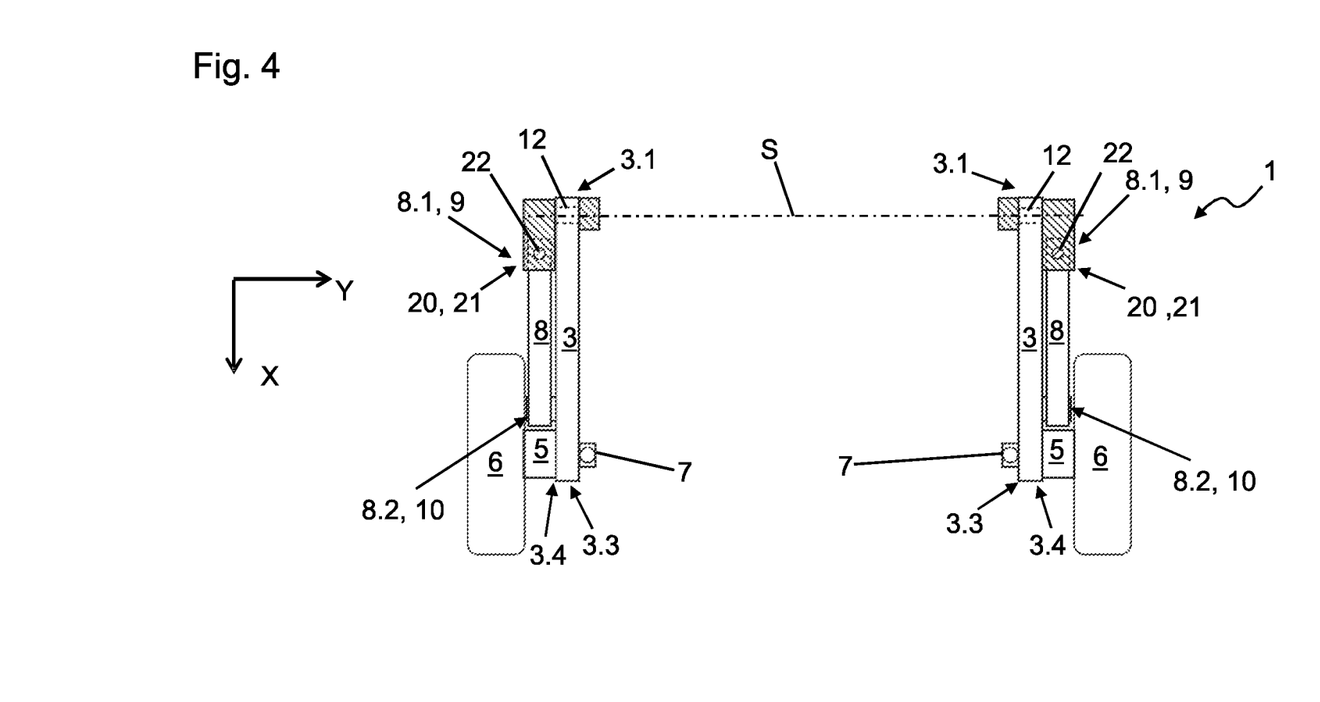
FIG. 4 shows a top view of a wheel suspension according to a third embodiment.

FIG. 4 shows a representation corresponding to FIG. 1 of a third embodiment of a wheel suspension 1 according to the invention. In this variant corresponding to a trailing link axle, an axle bridge (reference numeral 4 in the other embodiments) is entirely eliminated. Insofar as an excessive deflection on the same side needs to be prevented here, a stabilizer (not shown here) may be provided, for example, which in known manner transmits a force between the two trailing links 3 by torsion.

What is claimed is:

1. A motor vehicle rear suspension, comprising:
    left and right trailing links mounted, at respective forward ends thereof, to a vehicle body for pivoting movement about a transversely-extending axis and extending rearward from the axis, each of the trailing links comprising a wheel carrier attachment region adjacent a rear end thereof and a bearing element projecting outboard therefrom relative to a longitudinal centerline of the vehicle body; and
    left and right leaf springs fixed, at respective forward ends thereof, to the body and extending rearward therefrom alongside and outboard of the respective trailing links, each of the leaf springs having a rear end contacting and applying spring-force to the respective bearing element.

2. The suspension of claim 1, further comprising a transversely-extending axle bridge connecting the left and right trailing links.

3. The suspension of claim 1, wherein the leaf springs extend generally parallel to a vehicle X-axis.

4. The suspension of claim 1, wherein the leaf springs contacts upward-facing surfaces of the respective bearing elements.

5. A motor vehicle comprising:
    a sprung body;
    left and right trailing links mounted, at respective forward ends thereof, to the body for pivoting movement about a transversely-extending axis and extending rearward from the axis, each of the trailing links comprising a wheel carrier attachment region adjacent a rear end thereof;
    a left and a right bearing element extending outboard from the respective trailing link: and
    left and right leaf springs fixed, at respective forward ends thereof, to the body and extending rearward therefrom alongside and outboard of the respective trailing link, each of the leaf springs having a rear end contacting and applying spring-force to the respective bearing element.

6. The motor vehicle of claim 5, further comprising a transversely-extending axle bridge connecting the left and right trailing links.

7. The motor vehicle of claim 5, wherein the leaf springs extend generally parallel to a vehicle X-axis.

8. The motor vehicle of claim 5, wherein the leaf springs contact an upward-facing surface of the respective bearing element.

9. A motor vehicle rear suspension, comprising:
    left and right trailing links mounted to a vehicle body for pivoting movement about a transversely-extending axis and extending rearward from the axis, each having a wheel carrier attached thereto adjacent a rear end thereof, each trailing link comprising a bearing element extending transversely outboard therefrom relative to a longitudinal center-line of the vehicle body; and
    left and right cantilever springs fixed against rotation about a second transversely-extending axis at their respective forward ends to the body and extending rearward therefrom alongside and outboard from the respective trailing link, rear ends thereof contacting and applying spring-force to the respective bearing element.

10. The suspension of claim 9, further comprising a transversely-extending axle bridge connecting the left and right trailing links.

11. The suspension of claim 9, wherein the cantilever springs extend generally parallel to a vehicle X-axis.

12. The suspension of claim 9, wherein each of the cantilever springs contacts an upward-facing surface of the respective bearing element.

* * * * *